UNITED STATES PATENT OFFICE.

OTTO LIEBKNECHT AND BENNO HOMOLKA, OF FRANKFORT-ON-THE-MAIN, GERMANY, ASSIGNORS TO FARBWERKE, VORMALS MEISTER, LUCIUS & BRÜNING, OF HÖCHST-ON-THE-MAIN, GERMANY, A CORPORATION.

PROCESS OF MAKING INDOXYL.

SPECIFICATION forming part of Letters Patent No. 714,000, dated November 18, 1902.

Application filed February 26, 1902. Serial No. 95,797. (No specimens.)

*To all whom it may concern:*

Be it known that we, OTTO LIEBKNECHT, Ph. D., and BENNO HOMOLKA, Ph. D., citizens of the Empire of Germany, residing at Frankfort-on-the-Main, Germany, have invented a certain new and useful Process of Making Indoxyl or its Homologues, of which the following is a specification.

Our invention relates to the manufacture of indoxyl or its homologues by heating those organic compounds of the aromatic series which contain in the molecule once or more the group $R-N_1-CH_2-CO$, wherein "R" means the benzene residue $C_6H_5$ or a homologue of said residue at a high temperature, with such inorganic bodies as are capable of decomposing water, like the alkali metals, their alloys, also with heavy metals, alkaline-earth metals, alkali nitrids and alkaline-earth nitrids, and metal carbids.

As inorganic compounds which answer the above purpose the following may be mentioned: first, phenylglycin, its homologues, and the salts, esters, amids, and anhydrids of these bodies; second, the so-called "phenylglycinylphenylglycin," (Beilstein, *Handbuch der Organischen Chemie*, III, Vol. II, p. 430,) its homologues, and the salts, esters, and amids of these compound; third, alpha-phenylhydantoin (Beilstein, III, Vol. II, p. 383) and diphenylhydantoin (Beilstein, III, Vol. II, p. 402) and their homologues.

As the action of the above-stated inorganic bodies on the organic compounds in question is extremely violent in most cases, and as the inorganic bodies concerned here, except alkali amids and alkali metals, are mostly infusible or difficultly fusible, it is necessary to add to the mixtures suitable substances to act as fluxes or diluents. Such substances are the caustic alkalies and the alkali cyanids, especially a molecular mixture of caustic potash and caustic soda, distinguished by its low melting-point.

The operation in general may be illustrated as follows: One of the aforesaid compounds yielding indoxyl is gradually introduced into a mixture, melting at about 180° to 200° centigrade, of a flux and one of the aforesaid inorganic bodies capable of decomposing water, or a mixture of such bodies. In cases where it is preferable—for instance, when operating with alkali metals and alkaline-earth metals—the inorganic body referred to may be introduced into the mixture of the flux and the organic compound. The formation of indoxyl occurs rapidly, gas being evolved and the mass becoming orange-yellow to brown. After the reaction the cooled mass is dissolved in water, preferably with cooling and without access of air. The solution, if necessary, is filtered from insoluble by-products, and is further worked up in the known manner into indoxyl, or is directly used for the production of indigo in the known manner.

The following are examples of some mixtures suitable for the new process:

1. Forty-two parts of caustic potash, thirty parts of caustic soda, five parts of sodium or the equivalent proportion of another alkali metal, ten parts of the potassium salt of orthotolylglycin, or the equivalent proportion of another of the aforesaid substances which yield indoxyl.

2. Twenty-eight parts of caustic potash, twenty parts of caustic soda, five parts of magnesium nitrid or the equivalent proportion of another metal nitrid, five parts of alpha-phenylhydantoin or the corresponding proportion of one of the aforesaid compounds which yield indoxyl.

3. Sixty-three parts of caustic potash, forty-five parts of caustic soda, fifteen parts of calcium carbid or the equivalent proportion of another metal carbid, fifteen parts of the potassium salt of phenylglycinylphenylglycin or the equivalent proportion of another of the aforesaid compounds which yield indoxyl.

4. Twenty parts of an alloy of sodium and lead or the corresponding proportion of another alloy of an alkali metal or alkaline-earth metal with another metal, twenty parts of the potassium salt of phenylglycin or the equivalent proportion of another of the aforesaid compounds which yield indoxyl.

The method of effecting the fusion and the treatment of the product are in all cases as already described.

Having thus described our invention, we claim as new and desire to secure by Letters Patent—

The herein-described process of making indoxyl, which consists in causing substances adapted to decompose water at ordinary temperature to act on aromatic compounds containing the group $R-N_1-CH_2-CO$ (wherein "R" means the benzene residue $C_6H_5$,) substantially as set forth.

In testimony that we claim the foregoing as our invention we have signed our names in presence of two subscribing witnesses.

OTTO LIEBKNECHT.
BENNO HOMOLKA.

Witnesses:
ALFRED BRISBOIS,
BERNHARD LEYDECKER.